US012763519B2

(12) United States Patent
Martin

(10) Patent No.: US 12,763,519 B2
(45) Date of Patent: Oct. 13, 2026

(54) SLIDE ASSIST DUAL STAGE UNMATE CONNECTOR

(71) Applicant: TE Connectivity Solutions GmbH, Schaffhausen (CH)

(72) Inventor: Galen M. Martin, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 379 days.

(21) Appl. No.: 18/595,539

(22) Filed: Mar. 5, 2024

(65) Prior Publication Data

US 2025/0239811 A1 Jul. 24, 2025

Related U.S. Application Data

(60) Provisional application No. 63/623,986, filed on Jan. 23, 2024.

(51) Int. Cl.
*H01R 13/629* (2006.01)
*H01R 13/52* (2006.01)

(52) U.S. Cl.
CPC ... *H01R 13/62927* (2013.01); *H01R 13/5219* (2013.01)

(58) Field of Classification Search
CPC ...................... H01R 13/62927; H01R 13/5219
USPC .................................................. 439/346, 157
See application file for complete search history.

(56) References Cited

U.S. PATENT DOCUMENTS 5,478,251 A * 12/1995 Jaklin ................ H01R 13/6275 439/157
5,618,195 A * 4/1997 Cappe .............. H01R 13/62911 439/157
5,876,226 A * 3/1999 Tsukakoshi ...... H01R 13/62922 439/157
5,928,014 A * 7/1999 Sawayanagi ..... H01R 13/62905 439/157
5,964,603 A * 10/1999 Hanazaki ......... H01R 13/62905 439/157
6,113,407 A * 9/2000 Martin ..................... H01R 4/60 439/205
6,142,826 A * 11/2000 Bourillon ........... H01R 13/5219 439/157
6,155,850 A * 12/2000 Martin ................... H01R 13/40 439/157
6,210,184 B1 * 4/2001 Kodama .............. H01R 13/621 439/157
6,244,880 B1 * 6/2001 Fukase ............ H01R 13/62911 439/157
11,342,710 B2 * 5/2022 Hiramatsu ......... H01R 13/5025
(Continued)

*Primary Examiner* — Harshad C Patel

(57) ABSTRACT

An electrical connector assembly includes a first connector having a mechanical assist slide or locking device movably attached thereto, and a second connector adapted to be mated to the first connector in a mating direction. The slide is adapted to bias the first connector between a fully mated state and a partially mated state. In the partially mated state, at least a first mating terminal pair of the first and second connectors are electrically disconnected from one another, while at least a second mating terminal pair of the first and second connectors remain electrically connected. In this way, by way of example, the connector assembly enables the disconnection or bypass of a detection circuit, while maintaining power and ground connections through the connector.

20 Claims, 4 Drawing Sheets

(56) References Cited

U.S. PATENT DOCUMENTS

| | | | | |
|---|---|---|---|---|
| 12,191,609 | B2 * | 1/2025 | Martin | H01R 13/5202 |
| 2022/0255264 | A1 * | 8/2022 | Martin | H01R 13/62922 |

* cited by examiner

SLIDE ASSIST DUAL STAGE UNMATE CONNECTOR

CROSS-REFERENCE TO RELATED APPLICATION

This application claims the benefit of U.S. Provisional Patent Application No. 63/623,986, filed on Jan. 23, 2024, the whole disclosure of which is incorporated herein by reference in its entirety.

FIELD OF THE INVENTION

The present disclosure relates to electrical connectors and, more particularly, to an electrical connector including a mechanical assist.

BACKGROUND

Modern vehicles, by way of example, rely heavily on electrical systems for the implementation and control of various vehicle functions critical to both vehicle operation and occupant safety. Accordingly, the reliability of these systems, including their associated electrical connector assemblies (e.g., a connector and a corresponding mating connector), is of the utmost importance. During vehicle manufacturing for example, unintentional partial electrical connections formed between interconnected components can pose future risk to users, as well as negatively affect system reliability. In order to help prevent these types of assembly failures, detection circuits may be provided within a connector assembly, which are adapted to detect, for example, a properly mated connector and mating connector. Typically, these detection circuits include terminals in the connector engaging with corresponding conductive elements or terminals of the mating connector. The detection circuit generally establishes electrical contact between the connector and the mating connector at the same time as primary circuits of the connector and mating connector (e.g., power circuits and ground circuits). However, during manufacturing or system testing, by way of non-limiting example, it may be desired to disengage the detection circuit of the connector while maintaining engagement of the primary circuits.

Further, connector assemblies may include locking mechanisms and/or mechanical assist structures which fix the connector and mating connector in a mated state, as well as aid in the connection and disconnection of the connector assembly, respectfully. These structures are particularly relevant as the mating and unmating forces required in many modern connectors is quite high, and the need to prevent accidental disconnection is extremely critical.

SUMMARY

In one embodiment of the present disclosure, an electrical connector assembly includes a first connector having a mechanical assist slide or locking device movably attached thereto, and a second connector adapted to be mated to the first connector in a mating direction. The slide is adapted to bias the second connector from a fully mated state to a partially mated state, and vice versa. In the partially mated state, at least a first mating terminal pair of the first and second connectors are disconnected from one another, while at least a second mating terminal pair of the first and second connectors remains in a mated state. Thus, the connector assembly enables, for example, the disconnection or bypass of a detection circuit (by way of non-limiting example), while maintaining other types of connections (e.g., power and ground) through the connector assembly.

BRIEF DESCRIPTION OF THE DRAWINGS

The invention will now be described by way of example with reference to the accompanying Figures, of which.

DETAILED DESCRIPTION OF THE EMBODIMENTS

Figure 1:
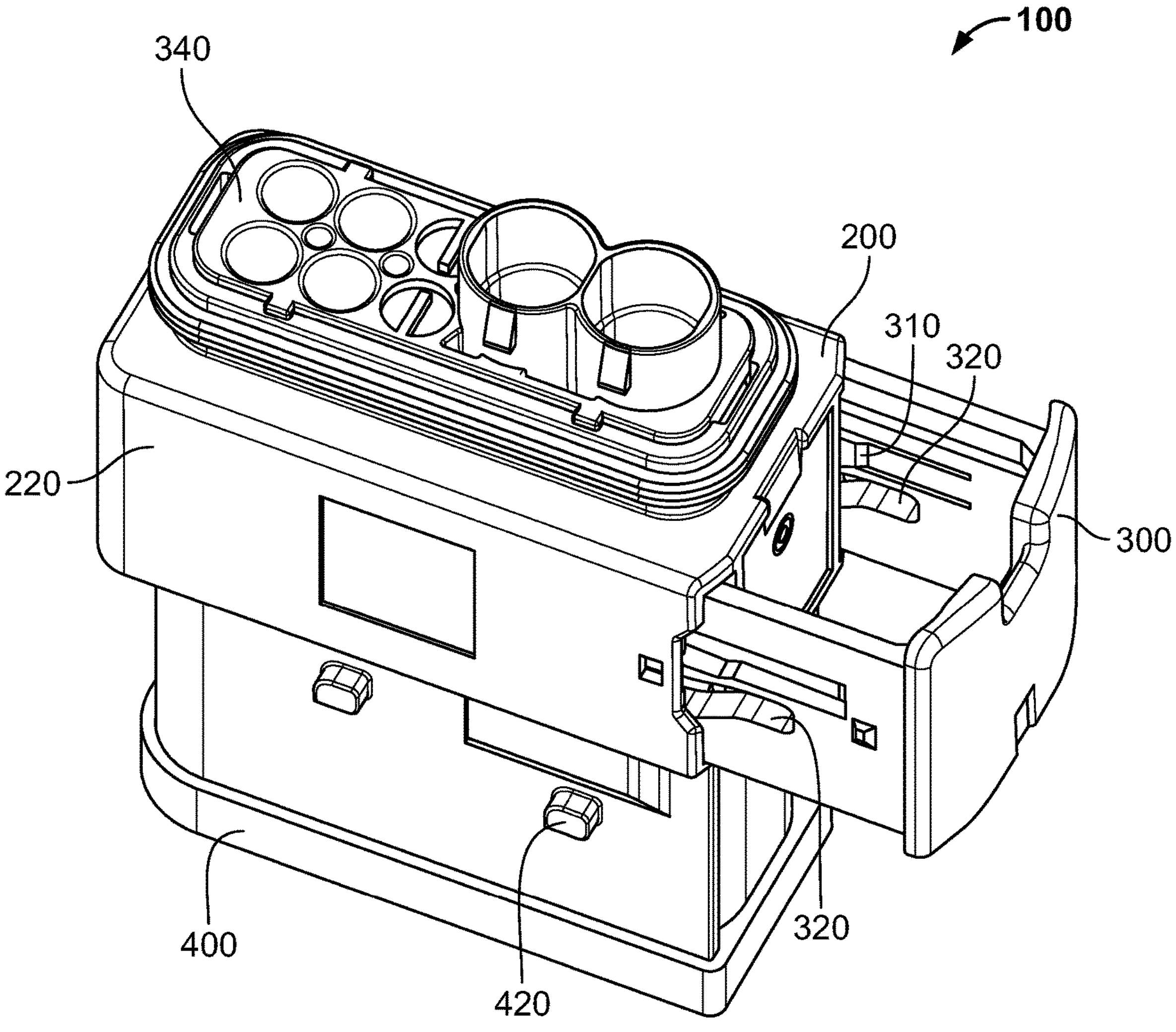
FIG. 1 is a perspective view of a connector assembly according to an embodiment of the present disclosure in an unmated or disconnected state.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

An electrical connector assembly according to an embodiment of the present disclosure includes a first connector, and a second or mating connector selectively connectable to the first connector. In a fully mated state of the first and second connectors, a movable slide is adapted to retain the first and second connectors in the fully mated condition, ensuring against their accidental disconnection during normal use. The slide includes at least one cam slot or guide. A corresponding cam follower is formed on the second connector. From the primary or fully mated state of the connector assembly, biasing the slide from a first or locking position to a second or release position is operative to partially separate the first and second connectors (i.e., as the guide slot biases or acts on the cam follower of the second connector). In one embodiment, a detection circuit associated with the connector assembly is automatically disabled by moving the slide into this second position (e.g., mating terminals or conductors thereof are electrically separated or isolated). However, one or more other electrical connections (e.g., power and ground connections) remain electrically connected or intact, absent further action by a user. In this second position, the slide is mechanically retained relative to the first connector via, for example, a latch.

Once the slide has reached the second position and the first set of terminals or conductors have been disengaged, the one or more cam followers are vertically aligned with openings in the slide and/or the first connector. In this way, the first and second connectors can be disconnected or separated in a traditional manner (e.g., in a direction opposite a mating direction), without interference from the slide. This completes a disconnection process of the connector assembly. In this way, embodiments of the present disclosure provide a dual-unmating function, wherein portions or terminals of the connector assembly's electrical connections can be separated independently, via distinct actions at different points in time.

Figure 4:
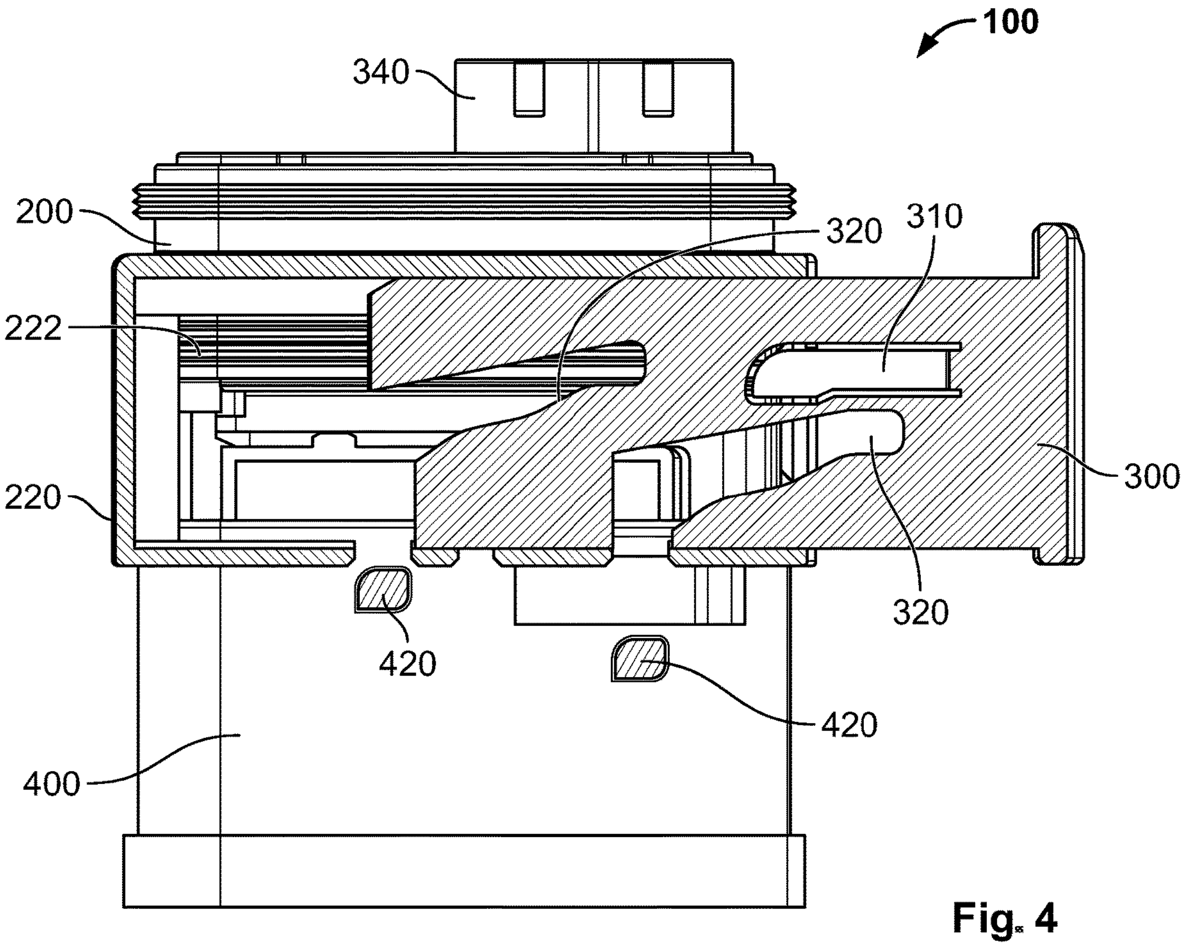
FIG. 4 is a side cross-sectional view of the connector assembly of FIG. 1.

Referring now to FIGS. 1 and 4, a connector assembly 100 is shown in a generally unmated or disconnected state. More specifically, a first connector 200 is placed in an aligned manner over a second mating connector 400. As described above, in this state, for example all electrical connections between the first and second connectors 200, 400 are electrically disconnected, including but not limited to, power connections, ground connections, signal connections, as well as detection circuits. The first connector 200 may further include an embedded insulator 340 adapted to hold a series of terminals and/or support a plurality of corresponding cables or wires (e.g., power, signal, ground and detection circuit terminals and associate cables or wires).

The connector assembly 100 further includes a slide 300. The slide 300 is movably or slidably attached to the first connector 200 (e.g., within a slot-like slide holder or housing 220 thereof, by way of non-limiting example). The slide 300 may be maintained in the illustrated extended or second position by a pair of elastic latches 310, although other features such as detents may also be used. Cam guides, guides slots, or guides 320, may be formed in one or more elongated sides for the slide 300. The guide slots 320 are adapted to engage with protrusions or cam followers 420 formed on the second connector 400, as will be set forth in detail herein. As will further be described, the slide 300 may act as a mechanical assist as well as a mechanical lock, aiding in mating the first and second connectors, 200, 400 together, maintaining their connection in the mated state, and aiding in at least partially releasing the connectors from the mated state.

Figure 2:
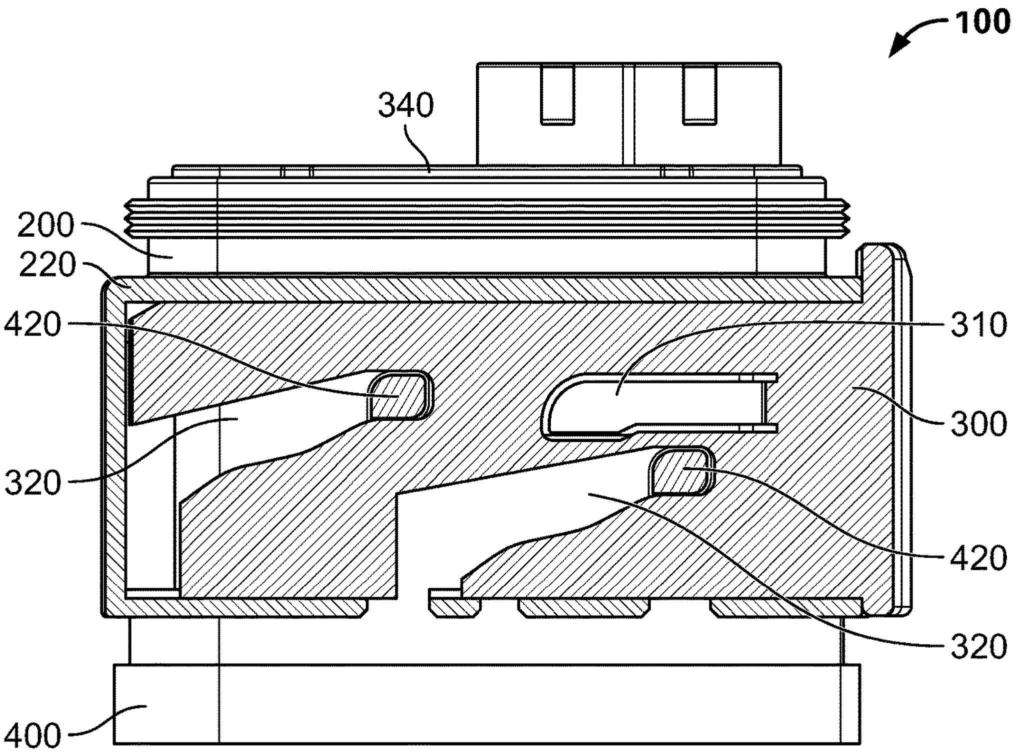
FIG. 2 is a side cross-sectional view of the connector assembly of FIG. 1 in a fully mated state.
Figure 5:
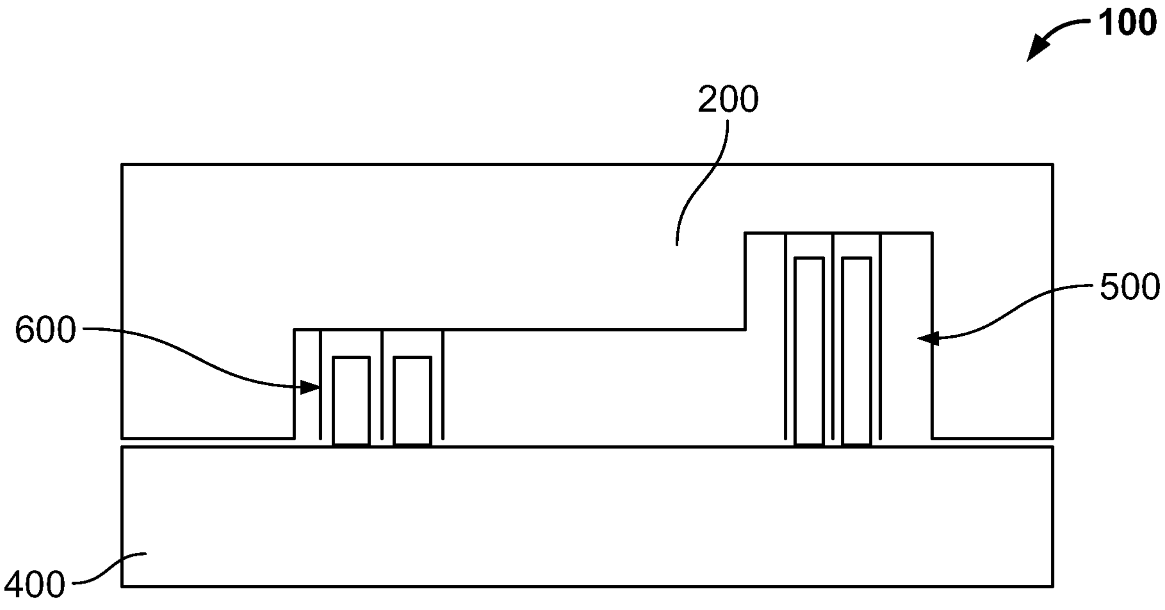
FIG. 5 is a simplified view illustrating terminal connections of the connector assembly of the preceding figures in the mated state.

Operation of the connector assembly 100 will now be described with references to FIGS. 2-4. In particular, FIG. 2 illustrates a fully mated state of the connector assembly 100. Notably, the cam followers 420 have been biased into a fully seated position within the guide slots 320 as the slide 300 has been biased into a first position from the second or extended position shown in FIG. 1. Specifically, the cam followers 420, and thus second connector 400, are biased upwardly toward the connector 200 under a force exerted by the guide slots 320 as the slide 300 is biased toward the connector assembly 100 (i.e., to the left in the figure). As the connectors 200, 400 are drawn together by the slide 300, their internal electrical connections or terminals are brought into electrical contact with one another, as shown in the simplified representation of FIG. 5. Specifically, each set of terminals 500, 600 are engaged with one another.

Figure 3:
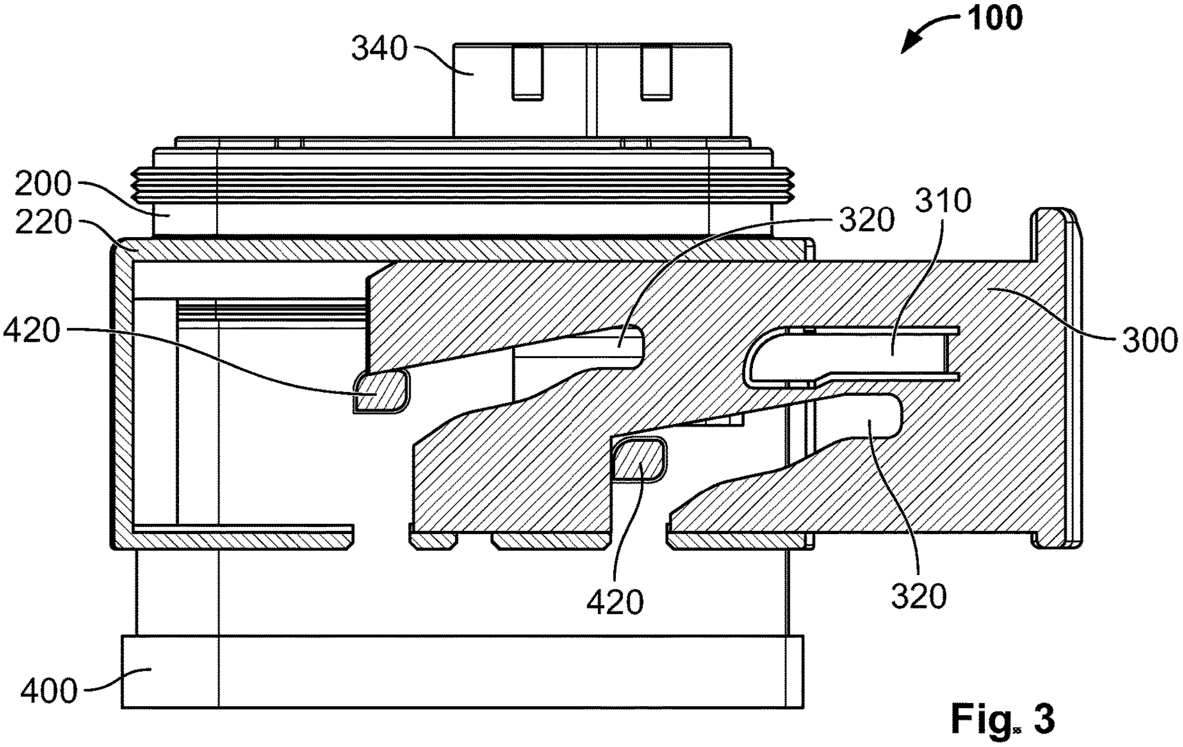
FIG. 3 is a side cross-sectional view of the connector assembly of the preceding figures in a partially mated state.
Figure 6:
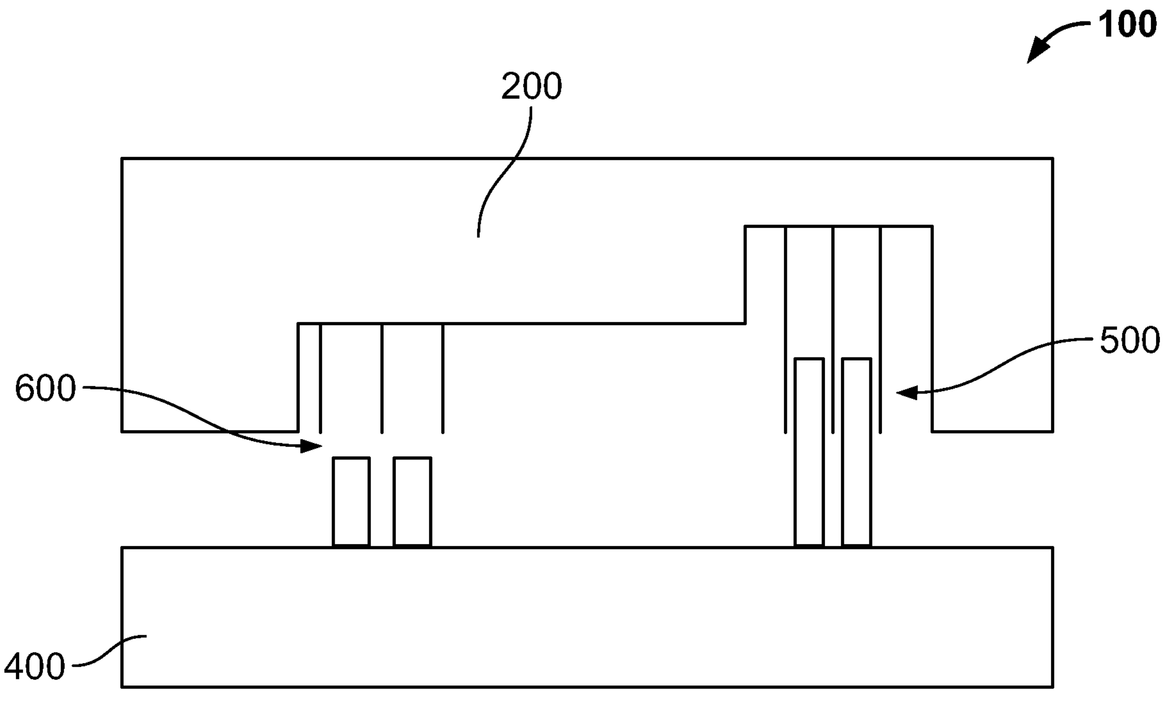
FIG. 6 is a simplified view illustrating terminal connections of the connector assembly of the preceding figures in a partially mated state.

From the mated state of FIG. 2, FIG. 3 illustrates a first unmated stage between the connectors 200, 400. More specifically, tension or a pulling force placed on the slide 300 away from the connector assembly 100 (i.e., to the right) partially disengages the connectors 200, 400, and a portion of the terminals arranged therein. Notably, as the slide 300 is biased to the right, the guide slots 320 are operative to bias the cam followers 420, and thus the connector 400, downwardly in a direction away from the connector 200. This first unmated stage is represented by the simplified illustration of FIG. 6. More specifically, terminals 600 associated with a detection circuit (by way of example only) of the connector assembly 100 have been disengaged within the respective connector 200, 400, while the additional terminals 500, such as power and ground terminals, remain electrically connected. In this way, FIG. 3 presents a first unmating stage of the connector assembly 100, with on a first a portion of a plurality of terminal disconnected.

As also shown in FIG. 3, with the slide 300 in the second or extended position, the cam followers 420 are vertically aligned with the illustrated openings in the bottom of the slide 300 and the bottom of the housing 220 of the connector 200. In this way, the first or second connector 200, 400 can be separated from one another in an unobstructed manner in the traditional unmating direction of the connector assembly 100. This second stage or unmated state is shown more clearly in FIG. 4, and represents the condition wherein the terminals 500, 600 shown in FIGS. 5 and 6 have been fully disconnected. Specifically, via either downward force on the connector 400, or upward tension on the connector 200, the connector halves are further separated to disengage their internal terminals. This disengagement may be resisted by, for example, friction forces generated between the terminals 500 and/or generated between one or more internal seals 222 of the connector assembly 100.

In the unmated connector state illustrated in FIGS. 1 and 4, it should be understood that reengagement of the connector 200 and the connector 400 may be achieved via reverse action to that described above. Specifically, the connectors 200, 400 may be biased together until the cam followers 420 engage with the guide slots 320 of the slide 300. After initial engagement, the slide 300 may be biased inwardly toward the first position, capturing the cam followers, and biasing them further upward, providing mechanical leverage to generate the insertion forces needed to establish the electrical connections via the terminals 500, 600. Once the electrical connections between the terminals 500, 600 are established, the slide 300 serves to maintain the connector 200 and the connector 400 in the mated condition shown in FIG. 2. Accordingly, the fully seated slide 300 serves as a mechanical lock, ensuring reliable connection between the components in harsh environments. The illustrated detents in the connector 200 and corresponding protrusions formed on the slide 300 may aid the retention of the slide 300 in the first position shown in FIG. 2.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An electrical connector assembly, comprising:
a first connector having a pair of conductive terminals;
a second connector having a pair of mating conductive terminals, and adapted to be mated to the first connector in a mating direction; and
a slide movably attached to the first connector and adapted to:
in a first position of the slide, maintain the first and second connectors in a mated state with the first pair of conductive terminals electrically connected to respective ones of the second pair of mating conductive terminals; and
in response to being biased into a second position, distinct from the first position:
partially disconnect the first connector from the second connector;
unmate a first terminal of the pair of conductive terminals from a first terminal of the pair of mating conductive terminals; and
maintain a second terminal of the pair of conductive of terminals in electrical contact with a second terminal of the pair of mating conductor terminals.

2. The electrical connector assembly of claim 1, wherein motion of the slide between the first position and the second position is automatically adapted to unmate the first terminal of the pair of conductive terminals from the second terminal of the pair of mating conductive terminals.

3. The electrical connector assembly of claim 1, wherein with the slide in the second position, the first connector and the second connector may be disconnected in an unmating direction opposite the mating direction.

4. The electrical connector assembly of claim 1, wherein:
one of the second connector or the slide defines a guide; and
the other one of the second connector or the slide defines a cam follower engaging with the guide to at least partially unmate the first connector and the second connector as the slide is moved from the first position to the second position.

5. The electrical connector assembly of claim 4, wherein, with the slide in the second position and the cam follower defined on the second connector, the cam follower is free to move out of the slide as the first connector is unmated from the second connector in the unmating direction.

6. The electrical connector assembly of claim 5, wherein, with the slide in the first position, the cam follower is captured within the guide of the slide and prevents the unmating of the first and second connectors in the unmating direction.

7. The electrical connector assembly of claim 1, wherein the slide is biased between the first position and the second position in a direction normal to the mating direction of the first connector and the second connector.

8. The electrical connector assembly of claim 7, wherein the first position is proximal to the connector assembly and the second position is distal to the connector assembly.

9. The electrical connector assembly of claim 8, further comprising a latch adapted to retain the slide in the second position.

10. The electrical connector assembly of claim 9, further comprising a retention assembly adapted to retain the slide in the first position.

11. The electrical connector assembly of claim 10, wherein the retention assembly incudes a detent and a protrusion formed on respective ones of the first connector and the slide.

12. The electrical connector assembly of claim 1, further comprising a seal arranged between the first connector and the second connector, wherein mating the second connector with the first connector at least partially engages the seal into a housing of the second connector.

13. The electrical connector assembly of claim 1, wherein the first terminal of the pair of conductive terminals and the first terminal the of pair mating conductive terminals form part of a detection circuit operative to determine a characteristic of the connector assembly.

14. The electrical connector assembly of claim 13, wherein the detection circuit is disabled with the slide in the second position.

15. The electrical connector assembly of claim 14, wherein the second terminal of the pair of conductive terminals of the first connector and the second terminal of the pair of mating conductive terminals of the second connector define at least one of power and ground terminals adapted to remain electrically connected with the slide in each of the first position and the second position.

16. An electrical connector assembly, comprising:
a first connector having a plurality of conductive terminals;
a second connector having a plurality of mating conductive terminals, and mateable to the first connector in a mating direction; and
a slide operatively connected to one of the first connector or the second connector and movable from a locking position to a release position in a release direction, wherein:
in the locking position, the first connector and the second connector are secured in a mated state with each of the plurality of conductive terminals electrically connected to the plurality of mating terminals; and
in the release position, a first portion of the plurality of conductive terminals and a corresponding first portion of the plurality of mating conductive terminals are electrically connected, and a second portion of the plurality of conductive terminal and a corresponding second portion of the plurality of mating conductive terminals are electrically disconnected.

17. The electrical connector assembly of claim 16, wherein the first and second connectors can only be unmated with the slide in the release position.

18. The electrical connector assembly of claim 16, wherein the second portion of the plurality of conductive terminal and the corresponding second portion of the plurality of mating conductive terminals are automatically electrically disconnected via motion of the slide from the locking position and into the release position.

19. The electrical connector assembly of claim 16, wherein in the release position of the slide, the first portion of the plurality of conductive terminals and the corresponding first portion of the plurality of mating conductive terminals are electrically disconnectable via relative motion between the first connector and the second connector in a direction opposite the mating direction and distinct from the release direction.

20. The electrical connector assembly of claim 16, wherein the slide defines a guide slot formed thereon, and the second connector includes a cam follower engaging the guide slot to at least partially unmate the first connector and the second connector as the slide moves from the locking position to the release position.

* * * * *